United States Patent [19]

Kilbarger

[11] Patent Number: 5,041,235

[45] Date of Patent: Aug. 20, 1991

[54] LIQUID HARD SURFACE CLEANER FOR POROUS SURFACES

[75] Inventor: Alan C. Kilbarger, Milford, Ohio

[73] Assignee: Henkel Corporation, Ambler, Pa.

[21] Appl. No.: 552,721

[22] Filed: Jul. 16, 1990

[51] Int. Cl.$^5$ .................. C09D 4/00; C09G 1/16; C11D 7/24

[52] U.S. Cl. ................ 252/170; 106/3; 106/10; 106/6; 106/11; 252/162; 252/174.23

[58] Field of Search ............ 106/3, 10, 6, 11; 252/162, 170, 174.23

[56] References Cited

U.S. PATENT DOCUMENTS

| | | | |
|---|---|---|---|
| 3,071,479 | 1/1963 | Fulenwider | 106/10 |
| 4,265,663 | 5/1981 | Gilicinski et al. | 106/11 |
| 4,354,871 | 10/1982 | Sutton | 106/3 |
| 4,434,067 | 2/1984 | Malone et al. | 252/88 |
| 4,481,126 | 11/1984 | Trinh et al. | 252/174.23 |
| 4,693,840 | 9/1987 | Trinh et al. | 252/174.23 |
| 4,810,407 | 3/1989 | Sandvick | 106/3 |

OTHER PUBLICATIONS

United States Steel Corporation Applied Research Laboratory, Saybolt Universal Viscosity, Apr., 1968, D-8-8-44 and d 2161-82.

*Primary Examiner*—Josephine Barr
*Assistant Examiner*—Bradley A. Swope
*Attorney, Agent, or Firm*—Ernest G. Szoke; Wayne C. Jaeschke; Real J. Grandmaison

[57] ABSTRACT

A process and liquid composition for cleaning, restoring and polishing a hard, porous surface wherein the composition contains from 0.1 to 4 weight percent of a surfactant, from 5 to 20 weight percent of a synthetic hydrocarbon oil, and from 76 to 94.9 weight percent of a $C_1$-$C_4$ aliphatic alcohol. The composition may be applied to a variety of work surfaces such as work benches and kitchen counters, particularly porous surfaces such as slate, wood, vinyl, tile and rubber, wiped thereon and the surface allowed to dry.

16 Claims, No Drawings

LIQUID HARD SURFACE CLEANER FOR POROUS SURFACES

BACKGROUND OF THE INVENTION

1. Field of the Invention

This invention relates to a composition useful for cleaning, restoring and polishing a variety of work surfaces such as work benches and kitchen counters, particularly porous surfaces including wood, vinyl, tile, rubber and the like.

2. Discussion of Related Art

Numerous compositions, prepared and used in various forms including pastes, liquids, and dry formulations, are known for cleaning and polishing a myriad of surfaces. When new, such surfaces usually have a high luster and are devoid of dirt and various soils. After use and aging, the surfaces gather dirt and soils and in general deteriorate in appearance. It is therefore necessary to clean and polish these surfaces to restore their general appearance. In addition, it is also desirable to add a protective coating to the surfaces to maintain their appearance.

Heretofore, it has been generally customary to carry out the step of cleaning and polishing the surfaces as separate operations. Individual compositions have been developed which are particularly adapted for these operations. It has been recognized that a composition which will clean and polish at the same time is highly desirable since such would avoid these duplicating operations involving extensive time and labor.

Such a combination cleaning and polishing composition is disclosed in U.S. Pat. No. 3,071,479 relating to a paste wax. The composition therein comprises of four essential ingredients; namely, a wax, a solvent, an abrasive and a silicone oil. When this composition is rubbed on a surface, the abrasive removes from the surface the dirt and grime, and the wax is deposited on the surface. However, it would be desirable to employ a composition not containing an abrasive since such component actually wears away the finish of the surface.

U.S. Pat. No. 4,434,067 is directed to a powdered, dry type cleaning composition containing polymeric material having a particle size of 37 to 105 microns, an inorganic salt, a fluid such as water or organic liquid, and surfactant. The organic liquid may be a $C_1$–$C_4$ aliphatic alcohol, high boiling hydrocarbon solvent or chlorinated hydrocarbon solvent. The composition is especially useful for cleaning textile fabrics such as pile fabrics.

Another cleaner-polish composition is disclosed in U.S. Pat. No. 4,354,871 for treatment of furniture surfaces. The composition contains a film-former such as a silicone, wax, resin, non-drying oil; a hydrocarbon solvent, 66 to 97 weight percent water, a surfactant and 0.5 to 6 weight percent of an alpha-olefin having 10 to 18 carbon atoms. It is stated therein that the presence of the alpha-olefin permits a substantial reduction in the amount of hydrocarbon solvents employed which is desirable since the latter have a substantial adverse effect on the gloss characteristics of the film-former.

No-wash or no-rinse liquid car cleaner compositions containing solid polymers are disclosed in U.S. Pat. Nos. 4,481,126 and 4,693,840. The compositions contain organic polymeric solids having a specific particle size, water and aliphatic hydrocarbon solvents as the liquid carrier, an organic suspending agent such as a surfactant and thickener, and silicone.

Further, U.S. Pat. No. 4,265,663 relates to a wax formulation containing liquid polyalphaolefins for application to varied surfaces. The preferred embodiment contains the polyalphaolefins in combination with silicones, and most preferably with metal salts such as zinc salts. However, the formulation appears to have a high water content, i.e., from about 22 to about 85 weight percent.

Thus, a need exists for a water-free liquid hard surface cleaner-polish having improved properties over those of the prior art.

Accordingly, it is an object of this invention to overcome the aforementioned disadvantages of the prior art and provide the desired advantages indicated herein.

DESCRIPTION OF THE INVENTION

Other than in the operating examples, or where otherwise indicated, all numbers expressing quantities of ingredients or reaction conditions used herein are to be understood as modified in all instances by the term "about".

The foregoing and other related objects are achieved, and the disadvantages of the prior art are obviated, by the provision of a liquid composition useful for cleaning, restoring or polishing a variety of work surfaces such as work benches and kitchen counters, particularly porous surfaces including wood, vinyl, tile, rubber and the like. The liquid composition, in its basic components, comprises from about 0.1 to about 4 weight percent of a surfactant, from about 5 to about 20 weight percent of a synthetic hydrocarbon oil, and from about 76 to about 94.9 weight percent of a $C_1$–$C_4$ aliphatic alcohol, all weights being based on the weight of the composition. The composition may be applied to the aforementioned surfaces and wiped or rubbed thereon, then allowed to dry. The composition is a clear, homogeneous solution and when used in the afore-mentioned manner provides work surfaces with a clean, shiny and polished appearance. In accordance with this invention, use of the composition on porous surfaces has been found to cleanse the surfaces of grease and oil while restoring the surfaces to a like-new appearance. The resulting cleaned surfaces are water-resistant with a dry, non-oily feel.

The surfactant component of the composition may be an anionic, cationic, nonionic and amphoteric surfactant. However, the surfactant component should preferably have a hydrophilic-lipophilic balance (HLB) or value of from about 5 to about 12 to provide a clear, homogeneous liquid composition. Surfactants having a lower or higher HLB generally do not provide acceptable solutions. In addition, the surfactant component is preferably present in an amount of from about 0.25 to about 2 weight percent, based on the weight of the liquid composition. Typical surfactants meeting the afore-mentioned HLB criteria include polyoxyethylene fatty acid esters and diesters such as tall oil containing about 12 moles of ethylene oxide and having an HLB value of about 12; polyoxyethylene fatty alcohols such as lauryl and tridecyl alcohol containing about 3 to about 4 moles of ethylene oxide and having an HLB value of about 8 to about 9; PEG-300 monooleate having an HLB value of about 10; sorbitan monopalmitate having an HLB value of about 6.6; and sorbitan monooleate having an HLB value of about 5. All of the aforementioned surfactants are commercially available from Henkel Corporation, Emery Group, Cincinnati, Ohio under various tradenames.

The synthetic hydrocarbon oil component is preferably selected from polyalphaolefins typically having a viscosity at about 100° F. of from about 5 to about 70 centistokes. Although not required herein, such polyalphaolefins are most generally derived from decene-1. Thus, the synthetic hydrocarbon oil component may comprise an aliphatic polyalphaolefin containing $C_{20}$–$C_{70}$ dimers, trimers and tetramers of decene-1. The polyalphaolefins selected preferably should also be based upon evaluation of their viscosity behavior, covering power, oily feel characteristics, and those which provide stable, clear, homogeneous compositions at a 5 to 20% by weight concentration range after being compounded into the composition. Such polyalphaolefins preferably should also have a SUS value of between 42 and 325; a smoke point of between 170° F. and 435° F.; a flash point of between 320° F. and 535° F.; and an evaporation rate at 300° F. for 22 hours at atmospheric pressure of 0.1 to 5% by weight.

The aforementioned synthetic hydrocarbon oil is available from Henkel Corporation, Emery Group, Cincinnati, Ohio under the tradenames Emery-3002, Emery-3004, Emery-3006, Emery-3008 and Emery-3010. These decene-1 based polyalphaolefins have a gas-liquid chromatography distribution as follows.

|  | E-3002 | E-3004 | E-3006 | E-3008 | E-3010 |
|---|---|---|---|---|---|
| Viscosity @ 100° F., cSt | 5 | 18 | 33 | 48 | 70 |
| GLC, % Dist. |  |  |  |  |  |
| $C_{20}$ | 98.0 | 0.5 |  |  |  |
| $C_{30}$ | 2.0 | 85.9 | 31.5 | 6.4 | 1.6 |
| $C_{40}$ |  | 13.6 | 45.8 | 44.0 | 36.3 |
| $C_{50}$ |  |  | 17.8 | 34.2 | 35.5 |
| $C_{60}$ |  |  | 4.4 | 11.7 | 13.7 |
| $C_{70+}$ |  |  | 0.9 | 3.7 | 12.9 |
| Mw |  | 440 | 559 | 649 | 702 |

The $C_1$–$C_4$ aliphatic alcohol component may be selected from methyl alcohol, ethyl alcohol, propyl alcohol, isopropyl alcohol and butyl alcohol. The alcohol component serves as a carrier for the surfactant and synthetic hydrocarbon oil components, and is preferably selected from ethyl alcohol and isopropyl alcohol.

The liquid composition of this invention provides distinct advantages over those of the prior art. For example, compared to prior art compositions, the composition of this invention performs multiple functions, in that a clear single-phase solution cleans a porous surface, seals it making it water resistant, imparts a smooth shiny appearance, and leaves a clean dry feel. Such complete hard-surface cleaning is accomplished using a single product, and in a single application step.

The present invention will be better understood from the examples which follow, all of which are intended to be illustrative only and not meant to unduly limit the scope of the invention. Unless otherwise indicated, percentages are on a weight-by-weight basis.

EXAMPLE I

A liquid hard surface cleaner composition was prepared having the following formulation.

| Component | %/wt. |
|---|---|
| surfactant(1) | 0.5 |
| synthetic hydrocarbon oil(2) | 9.0 |
| aliphatic alcohol(3) | 90.5 |
|  | 100.0 |

(1)polyoxyethylene tall oil ester having an HLB value of about 12, available from Henkel Corporation, Emery Group, Cincinnati, Ohio under the tradename Trydet 2681.
(2)polyalphaolefin E-3004, available from Henkel Corporation, Emery Group, Cincinnati, Ohio, having a viscosity at 100° F. of 18 centistokes and a SUS of 89, a smoke point of 330° F., and a flash point of 437° F.
(3)ethyl alcohol.

The composition was prepared by combining the surfactant and aliphatic alcohol with stirring until well blended. Then the synthetic hydrocarbon oil was slowly added thereto, again with stirring, until a clear single-phase solution was formed.

After preparation, the composition remained stable at 70° F. for 30 days.

The liquid composition was then evaluated in the reconditioning of worn, discolored, porous slate laboratory work benches. After preliminary washing the laboratory work benches to remove heavy soils therefrom, the liquid composition was applied thereto and wiped substantially uniformly thereover using a soft cloth. The laboratory work benches were allowed to dry and then evaluated for appearance. The laboratory work benches were found to have a clean, shiny, dry appearance and feel.

EXAMPLE II

A liquid hard surface cleaner composition was prepared having the following formulation.

| Component | %/wt |
|---|---|
| surfactant(1) | 4.0 |
| synthetic hydrocarbon oil(2) | 20.0 |
| aliphatic alcohol(3) | 76.0 |
|  | 100.0 |

(1)polyoxyethylene lauryl alcohol having an HLB value of about 9, available from Henkel Corporation, Emery Group, Cincinnati, Ohio under the tradename Trycol 5882.
(2)polyalphaolefin E-3002, available from Henkel Corporation, Emery Group, Cincinnati, Ohio, having a viscosity at 100° F. of 5 centistokes and a SUS of 42, a smoke point of 170° F., and a flash point of 320° F.
(3)isopropyl alcohol.

The composition was prepared as in Example I.

After preparation, the composition was a clear, homogeneous, single-phase solution which remained stable at 70° F. for 30 days.

The liquid composition was then evaluated in the reconditioning of worn, discolored, porous slate laboratory work benches. After washing the laboratory work benches to remove heavy soils therefrom, the liquid composition was applied thereto and wiped substantially uniformly thereover using a soft cloth. The laboratory work benches were allowed to dry and then evaluated for appearance. The laboratory work benches were found to have a clean, shiny, dry appearance.

EXAMPLE III

A liquid hard surface cleaner composition was prepared having the following formulation.

| Component | %/wt. |
|---|---|
| surfactant(1) | 1.0 |
| synthetic hydrocarbon oil(2) | 11.0 |

| Component | %/wt. |
|---|---|
| aliphatic alcohol(3) | 88.0 |
| | 100.0 |

(1)polyoxyethylene tridecyl alcohol having an HLB value of about 8, available from Henkel Corporation, Emery Group, Cincinnati, Ohio under the tradename Trycol 5993.
(2)polyalphaolefin E-3004, available from Henkel Corporation, Emery Group, Cincinnati, Ohio, having a viscosity at 100° F. of 18 centistokes and a SUS of 89, a smoke point of 330° F., and a flash point of 437° F.
(3)ethyl alcohol.

The composition was prepared as in Example I.

After preparation, the composition was a clear, homogeneous, single-phase solution which remained stable at 70° F. for 30 days.

The liquid composition was then evaluated in the reconditioning of worn, discolored, porous slate laboratory work benches. After washing the laboratory work benches to remove heavy soils therefrom, the liquid composition was applied thereto and wiped substantially uniformly thereover using a soft cloth. The laboratory work benches were allowed to dry and then evaluated for appearance. The laboratory work benches were found to have a clean, shiny, dry appearance.

EXAMPLE IV

A liquid hard surface cleaner composition was prepared having the following formulation.

| Component | %/wt. |
|---|---|
| surfactant(1) | 2.0 |
| synthetic hydrocarbon oil(2) | 17.0 |
| aliphatic alcohol(3) | 81.0 |
| | 100.0 |

(1)polyoxyethylene lauryl alcohol having an HLB value of about 9, available from Henkel Corporation, Emery Group, Cincinnati, Ohio under the tradename Trycol 5882.
(2)polyalphaolefin E-3006, available from Henkel Corporation, Emery Group, Cincinnati, Ohio, having a viscosity at 100° F. of 33 centistokes and a SUS of 155, a smoke point of 360° F., and a flash point of 460° F.
(3)methyl alcohol.

The composition was prepared as in Example I.

After preparation, the composition was a clear, homogeneous, single-phase solution which remained stable at 70° F. for 30 days.

The liquid composition was then evaluated in the reconditioning of worn, discolored, porous slate laboratory work benches. After washing the laboratory work benches to remove heavy soils therefrom, the liquid composition was applied thereto and wiped substantially uniformly thereover using a soft cloth. The laboratory work benches were allowed to dry and then evaluated for appearance. The laboratory work benches were found to have a clean, shiny, dry appearance.

EXAMPLE V

A liquid hard surface cleaner composition was prepared having the following formulation.

| Component | %/wt. |
|---|---|
| surfactant(1) | 0.1 |
| synthetic hydrocarbon oil(2) | 5.0 |
| aliphatic alcohol(3) | 94.9 |
| | 100.0 |

(1)sorbitan monooleate having an HLB value of about 5, available from Henkel Corporation, Emery Group, Cincinnati, Ohio under the tradename Emsorb 2500.
(2)polyalphaolefin E-3004, available from Henkel Corporation, Emery Group, Cincinnati, Ohio, having a viscosity at 100° F. of 18 centistokes and a SUS of 89, a smoke point of 330° F., and a flash point of 437° F.
(3)propyl alcohol.

The composition was prepared as in Example I.

After preparation, the composition was a clear, homogeneous, single-phase solution, which remained stable at 70° F. for 30 days.

The liquid composition was then evaluated in the reconditioning of worn, discolored, porous slate laboratory work benches. After washing the laboratory work benches to remove heavy soils therefrom, the liquid composition was applied thereto and wiped substantially uniformly thereover using a soft cloth. The laboratory work benches were allowed to dry and then evaluated for appearance. The laboratory work benches were found to have a clean, shiny, dry appearance.

EXAMPLE VI

A liquid hard surface cleaner composition was prepared having the following formulation.

| Component | %/wt. |
|---|---|
| surfactant(1) | 1.0 |
| synthetic hydrocarbon oil(2) | 7.0 |
| aliphatic alcohol(3) | 92.0 |
| | 100.0 |

(1)polyoxyethylene tall oil ester having an HLB value of about 12, available from Henkel Corporation, Emery Group, Cincinnati, Ohio under the tradename Trydet 2681.
(2)polyalphaolefin E-3008 available from Henkel Corporation, Emery Group, Cincinnati, Ohio, having a viscosity at 100° F. of 50 centistokes and a SUS of 233, a smoke point of 400° F., and a flash point of 496° F.
(3)ethyl alcohol.

The composition was prepared as in Example I.

After preparation, the composition was a clear, homogeneous, single-phase solution which remained stable at 70° F. for 30 days.

The liquid composition was then evaluated in the reconditioning of worn, discolored, porous slate laboratory work benches. After washing the laboratory work benches to remove heavy soils therefrom, the liquid composition was applied thereto and wiped substantially uniformly thereover using a soft cloth. The laboratory work benches were allowed to dry and then evaluated for appearance. The laboratory work benches were found to have a clean, shiny, dry appearance.

EXAMPLE VII

A liquid hard surface cleaner composition was prepared having the following formulation.

| Component | %/wt. |
|---|---|
| surfactant(1) | 2.0 |
| synthetic hydrocarbon oil(2) | 14.0 |
| aliphatic alcohol(3) | 84.0 |

| -continued | |
|---|---|
| Component | %/wt. |
| | 100.0 |

(1) polyoxyethylene tridecyl alcohol having an HLB value of about 8, available from Henkel Corporation, Emery Group, Cincinnati, Ohio under the tradename Trycol 5993.
(2) polyalphaolefin E-3004, available from Henkel Corporation, Emery Group, Cincinnati, Ohio, having a viscosity at 100° F. of 18 centistokes and a SUS of 89, a smoke point of 330° F., and a flash point of 437° F.
(3) butyl alcohol.

The composition was prepared as in Example I.

After preparation, the composition was a clear, homogeneous, single-phase solution which remained stable at 70° F. for 30 days.

The liquid composition was then evaluated in the reconditioning of worn, discolored, porous slate laboratory work benches. After washing the laboratory work benches to remove heavy soils therefrom, the liquid composition was applied thereto and wiped substantially uniformly thereover using a soft cloth. The laboratory work benches were allowed to dry and then evaluated for appearance. The laboratory work benches were found to have a clean, shiny, dry appearance.

What is claimed is:

1. A liquid composition for cleaning, restoring and polishing a hard, porous surface, said composition consisting essentially of from about 0.1 to about 4 weight percent of a surfactant having a hydrophilic-lipophilic value of from about 5 to about 12, from about 5 to about 20 weight percent of a synthetic hydrocarbon oil comprising a polyalphaolefin having a viscosity at about 100° F. of from about 5 to about 70 centistokes, and from about 76 to about 94.9 weight percent of a $C_1$–$C_4$ aliphatic alcohol, based on the weight of said composition.

2. A liquid composition as in claim 1 wherein said surfactant is selected from the group consisting of an anionic, cationic, nonionic and amphoteric surfactant.

3. A liquid composition as in claim 1 wherein said surfactant is selected from the group consisting of polyoxyethylene fatty acid esters and diesters containing about 12 moles of ethylene oxide and having a hydrophilic-lipophilic value of about 12, polyoxyethylene fatty alcohols containing about 3 to about 4 moles of ethylene oxide and having a hydrophilic-lipophilic value of about 8 to about 9, PEG-300 monooleate having a hydrophilic-lipophilic value of about 10, sorbitan monopalmitate having a hydrophilic-lipophilic value of about 6.6, and sorbitan monooleate having a hydrophilic-lipophilic value of about 5.

4. A liquid composition as in claim 1 wherein said surfactant is present in an amount of from about 0.25 to about 2 weight percent.

5. A liquid composition as in claim 1 wherein said synthetic hydrocarbon oil comprises an aliphatic polyalphaolefin containing $C_{20}$–$C_{70}$ dimers, trimers and tetramers of decene-1.

6. A liquid composition as in claim 1 wherein said polyalphaolefin has a smoke point of between about 170° F. and about 435° F., a flash point of between about 320° F. and about 535° F., and an evaporation rate at 300° F. for 22 hours at atmospheric pressure of from about 0.1 to about 5% by weight.

7. A liquid composition as in claim 1 wherein said aliphatic alcohol is selected from the group consisting of methyl alcohol, ethyl alcohol, propyl alcohol, isopropyl alcohol and butyl alcohol.

8. The process of cleaning, restoring and polishing a hard, porous surface, comprising applying to said surface a liquid composition consisting essentially of from about 0.1 to about 4 weight percent of a surfactant having a hydrophilic-lipophilic value of from about 5 to about 12, from about 5 to about 20 weight percent of a synthetic hydrocarbon oil comprising a polyalphaolefin having a viscosity at about 100° F. of from about 5 to about 70 centistokes, and from about 76 to about 94.9 weight percent of a $C_1$–$C_4$ aliphatic alcohol, based on the weight of said composition, and wiping said surface with said composition.

9. The process as in claim 8 wherein said surfactant is selected from the group consisting of an anionic, cationic, nonionic and amphoteric surfactant.

10. The process as in claim 8 wherein said surfactant is selected from the group consisting of polyoxyethylene fatty acid esters and diesters containing about 12 moles of ethylene oxide and having a hydrophilic-lipophilic value of about 12, polyoxyethylene fatty alcohols containing about 3 to about 4 moles of ethylene oxide and having a hydrophilic-lipophilic value of about 8 to about 9, PEG-300 monooleate having a hydrophilic-lipophilic value of about 10, sorbitan monopalmitate having a hydrophilic-lipophilic value of about 6.6, and sorbitan monooleate having a hydrophilic-lipophilic value of about 5.

11. The process as in claim 8 wherein said surfactant is present in an amount of from about 0.25 to about 2 weight percent.

12. The process as in claim 8 wherein said synthetic hydrocarbon oil comprises an aliphatic polyalphaolefin containing $C_{20}$–$C_{70}$ dimers, trimers and tetramers of decene-1.

13. The process as in claim 8 wherein said polyalphaolefin has a smoke point of between about 170° F. and about 435° F., a flash point of between about 320° F. and about 535° F., and an evaporation rate at 300° F. for 22 hours at atmospheric pressure of from about 0.1 to about 5% by weight.

14. The process as in claim 8 wherein said aliphatic alcohol is selected from the group consisting of methyl alcohol, ethyl alcohol, propyl alcohol, isopropyl alcohol and butyl alcohol.

15. The process as in claim 8 wherein said surface is a work bench or a kitchen counter.

16. The process as in claim 8 wherein said surface is made of slate, wood, vinyl, tile or rubber.

* * * * *